(12) United States Patent
Lee

(10) Patent No.: US 11,409,849 B2
(45) Date of Patent: Aug. 9, 2022

(54) SYSTEM, METHOD AND PROGRAM FOR PREVENTING UNAUTHORIZED COPIES OF WEBCOMICS AND TRACKING REPLICATED WEBCOMICS

(71) Applicant: LIMA Security Lab Co., Ltd., Sejong-si (KR)

(72) Inventor: Jun Young Lee, Seoul (KR)

(73) Assignee: LIMA Security Lab Co., Ltd., Sejong-si (KR)

( * ) Notice: Subject to any disclaimer, the term of this patent is extended or adjusted under 35 U.S.C. 154(b) by 296 days.

(21) Appl. No.: 16/525,927

(22) Filed: Jul. 30, 2019

(65) Prior Publication Data
US 2019/0354658 A1 Nov. 21, 2019

Related U.S. Application Data

(63) Continuation of application No. PCT/KR2017/014044, filed on Dec. 4, 2017.

(30) Foreign Application Priority Data

Jan. 31, 2017 (KR) .................. 10-2017-0013494
Jul. 21, 2017 (KR) .................. 10-2017-0092399
Oct. 23, 2017 (KR) .................. 10-2017-0137569

(51) Int. Cl.
*G06K 9/00* (2022.01)
*G06F 21/16* (2013.01)
(Continued)

(52) U.S. Cl.
CPC .............. *G06F 21/16* (2013.01); *G06F 21/31* (2013.01); *G06F 21/6227* (2013.01);
(Continued)

(58) Field of Classification Search
None
See application file for complete search history.

(56) References Cited

U.S. PATENT DOCUMENTS

2008/0059481 A1  3/2008  Kunimatsu et al.
2015/0062132 A1* 3/2015  Chann .................. A63F 13/60
                                              345/473
2016/0328389 A1* 11/2016 Kim .................... G06F 40/109

FOREIGN PATENT DOCUMENTS

EP       2827537 A1    1/2015
JP     2013-077075 A    4/2013
(Continued)

OTHER PUBLICATIONS

Office Action issued by Korean Patent Office dated Jul. 5, 2019, which corresponds to Korean Patent Application No. 10-2017-0137569.
(Continued)

*Primary Examiner* — Wei Wen Yang
(74) *Attorney, Agent, or Firm* — Studebaker & Brackett PC

(57) ABSTRACT

The present invention relates to a system, a method, and a program for preventing unauthorized copies of webcomics and tracking replicated webcomics. A method for preventing unauthorized copies of webcomics according to one embodiment of the present invention comprises: a step (S100) in which a service server separates and stores webcomic images and dialogue text which are included in general webcomic data; a step (S110) of recognizing a user operation for a user client and recognizing a point on a webcomic that has moved from an initial position; and a step (S120) of providing final webcomic data that combines the webcomic images and the dialogue text with respect to an area displayed in real time on a screen of the user client.

7 Claims, 9 Drawing Sheets

(51) Int. Cl.
*G06F 21/31* (2013.01)
*G06F 21/84* (2013.01)
*G06F 40/106* (2020.01)
*G06T 11/60* (2006.01)
*G06F 21/62* (2013.01)
*G06Q 20/12* (2012.01)
*H04N 21/81* (2011.01)
*H04N 21/8358* (2011.01)

(52) U.S. Cl.
CPC ............ *G06F 21/84* (2013.01); *G06F 40/106* (2020.01); *G06Q 20/1235* (2013.01); *G06T 11/60* (2013.01); *G06F 2221/0737* (2013.01); *G06F 2221/0744* (2013.01); *H04N 21/8153* (2013.01); *H04N 21/8358* (2013.01)

(56) References Cited

FOREIGN PATENT DOCUMENTS

| | | |
|---|---|---|
| JP | 2013-088837 A | 5/2013 |
| JP | 2014-032682 A | 2/2014 |
| JP | 2017-004483 A | 1/2017 |
| KR | 10-2005-0026769 A | 3/2005 |
| KR | 10-2012-0113167 A | 10/2012 |
| KR | 10-2015-0003928 A | 1/2015 |
| KR | 10-1552509 B1 | 9/2015 |
| KR | 10-2016-0118929 A | 10/2016 |
| WO | 01/95079 A1 | 12/2001 |

OTHER PUBLICATIONS

International Search Report issued in PCT/KR2017/014044; dated Mar. 8, 2018.
The extended European search report issued by the European Patent Office dated Jan. 9, 2020, which corresponds to European Patent Application No. 17895469.9-1218 and is related to U.S. Appl. No. 16/525,927.
An Office Action; "Notice of Reasons for Refusal", mailed by the Japanese Patent Office dated Aug. 4, 2020, which corresponds to Japanese Patent Application No. 2019-562259 and is related to U.S. Appl. No. 16/525,927.
An Office Action; "Notice of Reasons for Refusal", mailed by the Japanese Patent Office dated Mar. 30, 2021, which corresponds to Japanese Patent Application No. 2019-562259 and is related to U.S. Appl. No. 16/525,927.

* cited by examiner

SYSTEM, METHOD AND PROGRAM FOR PREVENTING UNAUTHORIZED COPIES OF WEBCOMICS AND TRACKING REPLICATED WEBCOMICS

CROSS-REFERENCE TO RELATED APPLICATIONS

The present application is a continuation of International Patent Application No. PCT/KR2017/014044, filed on Dec. 4, 2017, which is based upon and claims the benefit of priority to Korean Patent Application Nos. 10-2017-0013494, filed on Jan. 31, 2017, 10-2017-0092399 filed on Jul. 21, 2017 and 10-2017-0137569, filed on Oct. 23, 2017. The disclosures of the above-listed applications are hereby incorporated by reference herein in their entirety.

BACKGROUND

Embodiments of the inventive concept described herein relate to a system, a method, and a program for preventing unauthorized copies of webcomics and tracking the replicated webcomics, and more particularly, relate to a system, a method, and a program for preventing unauthorized copies and distribution of webcomics provided to a client by a user and tracking the replicated webcomics.

Generally, the online digital comic data service over Internet, which is referred to as "webcomics", is provided by a portal site. When comic data is requested from a mobile communication terminal (a smartphone, a note pad, or a PC), which is a client connected to a web server over Internet, the comic data prepared on the web server is provided over Internet.

Recently, there have been a lot of problems that the webcomic image is copied without permission and is distributed. The author and webcomic distribution platform are damaged by copying and distributing the entire webcomic data to a cafe or the like without permission. When a user subscribes to webcomics through a web page or an application, because users may easily download entire webcomic data as the entire webcomic data is provided to a user client at one go, illegal distribution of illegal downloads of webcomics may increase.

To solve the above-described issue, there is a need for the technology of preventing webcomic subscribers from illegally downloading the entire webcomic data at one go.

SUMMARY

Embodiments of the inventive concept provide a system, a method, and a program for preventing unauthorized copies of webcomics and tracking the replicated webcomics, by preventing some areas of the webcomics provided to the user client from being exposed.

Embodiments of the inventive concept provide a method, a program, and a system for tracking the replicated webcomics, by tracking a user who illegally distribute webcomics based on the identification data contained in the webcomics provided to the user client.

The technical problems to be solved by the inventive concept are not limited to the aforementioned problems, and any other technical problems not mentioned herein will be clearly understood from the following description by those skilled in the art to which the inventive concept pertains.

According to an exemplary embodiment, a method for protecting unauthorized copies of webcomics includes separating and storing, by a service server, a webcomic image and a dialogue text, which are included in a general webcomic data, recognizing a user operation for a user client to recognize a position on a webcomic that has moved from an initial position, and combining, by the service server or a service application, the webcomic image and the dialogue text to provide final webcomic data to an area displayed in real time on a screen of a user client.

According to an exemplary embodiment, a method for tracking replicated webcomics includes generating, by a server providing a user with a webcomic image, identification data based on at least one of user identification information and usage time information, generating a watermark based on the identification data, generating final webcomic data by including the generated watermark in the webcomic image, and providing the user with the final webcomic data.

According to an exemplary embodiment, a method for protecting unauthorized copies of webcomics includes separating and storing, by a service server, a webcomic image and a dialogue text, which are included in a general webcomic data, recognizing a user operation for a user client to recognize a position on a webcomic that has moved from an initial position, and combining, by the service server or a service application, the webcomic image and the dialogue text to provide final webcomic data to an area displayed in real time on a screen of a user client.

According to another embodiment, the separating and the storing includes receiving, by the service server, the webcomic image and the dialogue text from a webcomic author client in a state where the webcomic image and the dialogue text are separated.

According to another embodiment, the webcomic author client separates a webcomic image and respective dialogue data using a dedicated program to generate a respective file, when a webcomic author directly enters a dialogue on the webcomic image.

According to another embodiment, the dialogue text includes pieces of respective dialogue data, and each of the pieces of respective dialogue data includes combination position data to be displayed in a specific webcomic frame.

According to another embodiment, the method may further include dividing, by the service server, the webcomic image into each webcomic frame to assign first identification information, assigning, by the service server, second identification information to each dialogue combination position in the webcomic image, and adding the first identification information and the second identification information about a dialogue combination position of a specific webcomic frame matched with each of the pieces of respective dialogue data, to each of the pieces of respective dialogue data as the combination position data.

According to another embodiment, the providing of the final webcomic data includes combining respective dialogue data with a webcomic frame that will appear in succession to a currently displayed screen depending on the user operation and removing respective dialogue data previously combined with the webcomic image.

According to another embodiment, the providing of the final webcomic data includes providing, by the service server, the user client with a webcomic image of a specific episode, extracting respective dialogue data corresponding to a current screen display area or a webcomic frame adjacent to the current screen display area, from the dialogue text to transmit the respective dialogue data to the user client, and combining, by the service application, the respective dialogue data with the webcomic image in real time.

According to an exemplary embodiment, a method for protecting unauthorized copies of webcomics includes combining, by a service server or a service application, an opaque layer on a webcomic to generate final webcomic data, recognizing a user operation for a user client to recognize a point on a webcomic that has moved from an initial position, and changing and providing only an area displayed on a screen transparently by an operation of the user client.

According to an exemplary embodiment, a program for protecting unauthorized copies of webcomics is stored in a medium to execute the method for protecting unauthorized copies of webcomics, in combination with a computer that is a piece of hardware.

According to another exemplary embodiment, a method for tracking replicated webcomics may include generating, by a server providing a user with a webcomic image, identification data based on at least one of user identification information and usage time information, generating a watermark based on the identification data, generating final webcomic data by including the generated watermark in the webcomic image, and providing the user with the final webcomic data.

Moreover, the method for tracking replicated webcomics may further include searching for the watermark in replicated webcomic data and restoring the identification data based on the watermark to identify an illegal distributor, when the final webcomic data is replicated.

Furthermore, the generating of the final webcomic data may include positioning the watermark at a position not distinguished by a naked eye in the webcomic image.

Also, the watermark may be entered in a form of a bar code in a space between webcomic frames, or may be thinly entered along an image line in a webcomic.

In addition, the generating of the final webcomic data may include generating a first layer including the webcomic image, generating a second layer in which the watermark is positioned at a watermark attachable position received from a service server, and combining the first layer and the second layer to generate the final webcomic data.

Moreover, the generating of the watermark may include dividing the identification data into pieces of identification data to generate a plurality of watermarks, and the generating of the final webcomic data may include positioning the generated plurality of watermarks in a plurality of areas of the webcomic image, respectively.

Furthermore, the plurality of watermarks may overlap with a part of the divided pieces of identification data.

Also, the generating of the plurality of watermarks may include generating restoration data including information about a position and placement order in which the plurality of watermarks are positioned, to restore the identification data based on the plurality of watermarks.

In addition, the method may further include setting indistinguishable characters to one group upon restoring the identification data and setting a key set for forming the identification data for selecting only one character as a usable character in the set group, when the plurality of watermarks are composed of texts.

According to an exemplary embodiment, a program for tracking replicated webcomics is stored in a medium to execute the method for tracking replicated webcomics in combination with a computer that is a piece of hardware.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
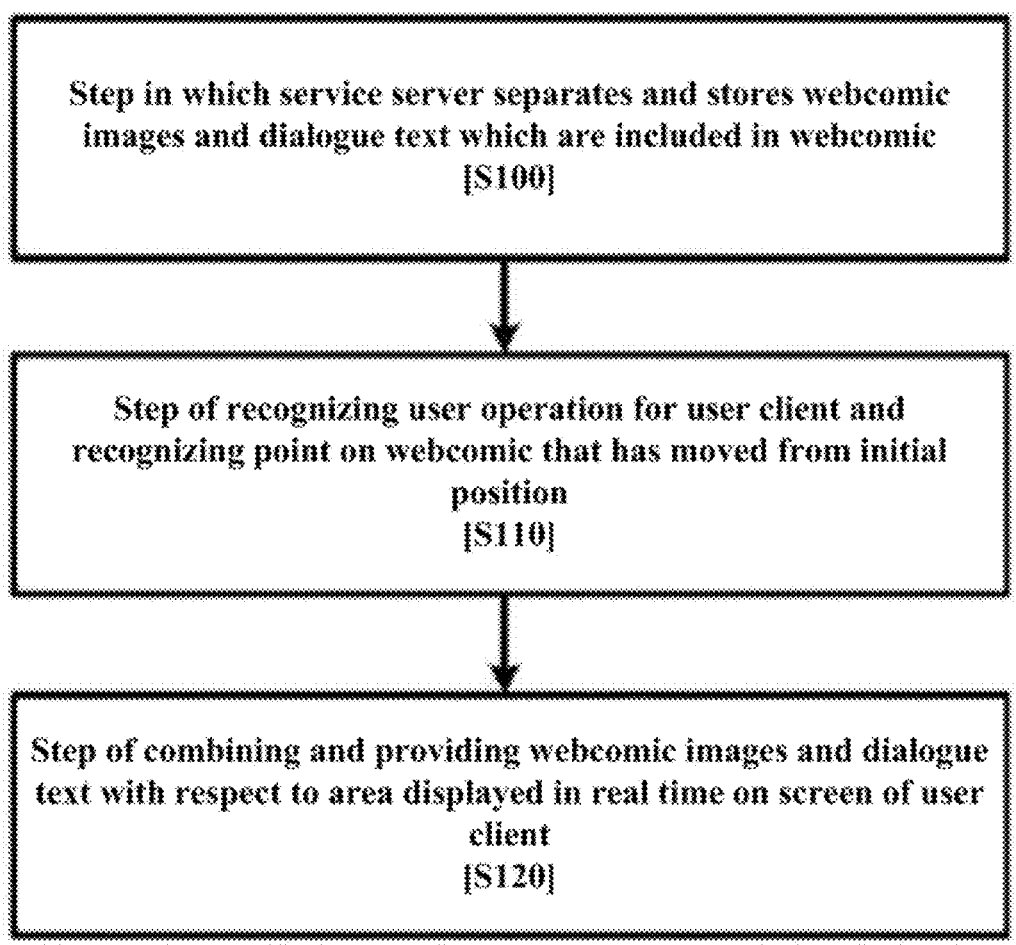
FIG. 1 is a flowchart of a method for preventing unauthorized copies of webcomics, according to an embodiment of the inventive concept.
Figure 2:
FIG. 2 is an exemplary view in which a dialogue text is combined with only a webcomic image area displayed on a screen of a user client, according to an embodiment of the inventive concept.

Hereinafter, exemplary embodiments of the inventive concept will be described in detail with reference to the accompanying drawings. The above and other aspects, features and advantages of the inventive concept will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements.

In the specification, 'general webcomic data' refers to data of a general webcomic type, in which a dialogue and an image are combined with each other.

In the specification, a 'webcomic image' means that only the image is included in the general webcomic data other than the dialogue.

In the specification, a 'dialogue text' means data obtained by collecting the dialogue included in the general webcomic data.

In the specification, 'respective dialogue data' means each dialogue included in the dialogue text. The 'respective dialogue data' may be included in a specific speech balloon within each webcomic frame and may be applied as a single unit.

In the specification, an 'opaque layer' means a layer capable of transparently processing only a specific area.

In the specification, 'final webcomic data' means webcomic data processed such that the part of webcomic images or dialogue texts constituting the general webcomic data is not displayed.

In the specification, a 'service server' refers to a server that stores the webcomic data of an author and provides the webcomic data to a user client.

In the specification, a 'service application' refers to an application that provides webcomics received from the service server. The 'service application' may simply provide a specific type of webcomic data provided from the service server and may generate the final webcomic data by combining webcomic images and dialogue texts provided from the service server.

In the specification, a 'webcomic maker client' refers to a client used by the webcomic maker and means a terminal device that transmits webcomic data to the service server.

In the specification, the 'user client' means a terminal device that displays the webcomic data received from the service server or the webcomic data generated by the service application, on a screen.

Hereinafter, a system, a method, and a program for preventing unauthorized copies of webcomics and tracking the replicated webcomics will be described with reference to drawings.

FIG. 1 is a flowchart of a method for preventing unauthorized copies of webcomics, according to an embodiment of the inventive concept.

Referring to FIG. 1, according to an embodiment of the inventive concept, a method for protecting unauthorized copies of webcomics may include a step S100 in which a service server separates and stores a webcomic image 100 and a dialogue text 200 which are included in general webcomic data, a step S110 of recognizing a user operation for a user client to recognize a point on the webcomics that has moved from an initial position, and a step S120 of providing final webcomic data, which is obtained by combining the webcomic image 100 and the dialogue text 200, to the area displayed in real time on the screen of the user client. That is, the service server separates and manages the webcomic image 100 and the dialogue text 200 and combines and provides the webcomic image 100 and the dialogue text 200 to only the area provided to the user client. Hereinafter, the detailed description about each step is provided.

In step S100, the service server separates and stores the webcomic image 100 and the dialogue text 200, which are included in the webcomics. In an embodiment, the service server separately receives the webcomic image 100 and the dialogue text 200 from the client of a webcomic maker (i.e., an author). That is, the service server receives the webcomic image 100 in the form of an image file and the dialogue text 200 in the form of a text, from the webcomic maker. The webcomic author may draw the webcomic image 100 in a webcomic maker client and then may separately create a dialogue as a text file; the webcomic author performs a general webcomic creation process (i.e., the process of directly entering a dialogue into the speech bubble in webcomics) and may perform a webcomic work, using a program that automatically separates the webcomic image 100 and the dialogue text 200, thereby automatically separately generating the webcomic image 100 and the dialogue text 200.

Furthermore, according to another embodiment, the service server recognizes and extracts a text through OCR, image recognition, or the like from the general webcomics received from a webcomic maker client, removes the text from the webcomics, and generates the webcomic image 100. That is, the webcomic maker performs the webcomic creation process in the existing manner in the user client to transmit general webcomic data including a dialogue to the service server, and the service server performs the process of separating the webcomic image 100 and the dialogue text 200 through OCR or image recognition. The method in which the service server separates and stores the webcomic image 100 and the dialogue text 200 is not limited to the described method and various methods may be applied.

Moreover, for the purpose of combining the webcomic image 100 and the dialogue text 200 while the webcomic image 100 and the dialogue text 200 are displayed on the screen of the user client after the webcomic image 100 and the dialogue text 200 are separated and stored, the webcomic image 100 or the dialogue text 200 may include data (i.e., combination position data) associated with a dialogue combination position. According to an embodiment, respective dialogue data 210 included in the dialogue text 200 may include data associated with the position to be displayed on the webcomic image 100. That is, webcomic frame information, which needs to be combined with each dialogue and position information in the corresponding frame, may be included. The position information may be specified in one or more areas (or combination areas) in which each dialogue needs to be combined within each webcomic frame; when an identification number is assigned to each combination area, the position information may be an identification number corresponding to the combination area (or combination position).

To this end, the service server divides the webcomic image 100 into respective webcomic frames to assign first identification information. The first identification information is identification information matched with a specific webcomic frame. Afterward, the service server assigns the second identification information to each dialogue combination position within the webcomic image 100. The second identification information is identification information matched with each combination area (or combination position) that is present in the webcomic frame. Afterward, the service server may add the first identification information and the second identification information about the dialogue combination position of a specific webcomic frame with which the respective dialogue data 210 is matched, to the respective dialogue data 210 as combination position data.

In step S110, the service server or the service application recognizes the user operation for the user client to recognize the position on webcomics moved from an initial position. That is, the service server or the service application recognizes the current screen position of the user client provided by webcomics, in the entire webcomic image 100.

According to an embodiment, the service application installed in the user client grasps a user operation state, which is entered by a user into the user client to receive the next area of webcomics, to calculate the current screen position. For example, when the user client is a PC, the service application (e.g., a program operating together with an Internet browser when the user subscribes to webcomics using a web page) installed in the PC measures the degree of scroll using a mouse to calculate the current screen position reached from the initial position of the webcomics. Moreover, for example, when the user client is a mobile terminal including a touch screen, the service application installed in a mobile terminal measures a screen changing speed (e.g., the screen is quickly changed as the user strongly performs a swiping operation) according to the swiped degree or the swiping operation and calculates the current screen position, which is reached from the initial position of the webcomics, based on the screen changing speed.

In step S120, the service server or the service application may combine the webcomic image 100 and the dialogue text 200 to provide the combined result to the area displayed in real time on the screen of the user client. That is, the service server or the service application may combine the dialogue text 200 in only the area of the webcomic image 100 corresponding to the screen position displayed on the user client.

For example, when the webcomic image 100 and the dialogue text 200 are combined by the service application, the respective dialogue data 210 is combined with the webcomic frame that will appear in succession to the currently displayed screen depending on the user operation, and the respective dialogue data 210 combined previously with the webcomic image 100 is removed. At this time, the service server may transmit the dialogue text 200 in real time in a state of encrypting the dialogue text 200.

According to an embodiment, in step S120, the service application installed in the user client may combine the webcomic image 100 with the dialogue text 200 to display final webcomic data on a screen. For example, the service server may provide the specified webcomic image 100 of the specific episode to the user client and may extract the respective dialogue data 210, which corresponds to the current screen display area or the webcomic frame adjacent to the current screen display area, from the dialogue text 200 to transmit the respective dialogue data 210 to the user client. Afterward, the service application may combine the respective dialogue data 210 with the webcomic image 100 in real time.

Furthermore, for example, when the webcomic data is set to a set of one or more webcomic frames and is provided from the service server to the user client in units of sets, the service server encrypts and transmits the entire text data included in the specific episode of the specified webcomics, to the user client. Afterward, the service server provides the user client with one or more webcomic frames (i.e., frame set) that need to be displayed on the screen later. Afterward, the service server may make a request for the combination of the dialogue text 200 corresponding to the webcomic frame received by the service application in the user client.

According to another embodiment, in step S120, the service server may provide final webcomic data obtained by combining a dialogue with the webcomic frame (e.g., the specific number of webcomic frames after the webcomic frame currently displayed on the screen of the user client) requested from the user client. In this way, the webcomic frame provided from the service server to the user client is in the form of the general webcomic combined with the dialogue, but is sequentially provided without providing the entire general webcomic image 100 at a time, and thus a user may fail to illegally download the entire webcomics (i.e., general webcomic data) including all dialogues, at a time.

Moreover, the service server or the service application may encrypt and store the dialogue text 200. The service server or the service application may decrypt and provide the dialogue, which has been encrypted and stored over the webcomic image 100. In this way, even though the user captures the consecutively entire screens of webcomics for unauthorized copies/replication, the dialogue text 200 is not included in an area other than a display area provided to the screen of the user client, and thus the capture image to be illegally distributed may not be directly generated. Accordingly, the specific episode of the webcomics may be prevented from being illegal distributed, by storing or capturing the entire images of the webcomics provided to the user client.

Figure 3:
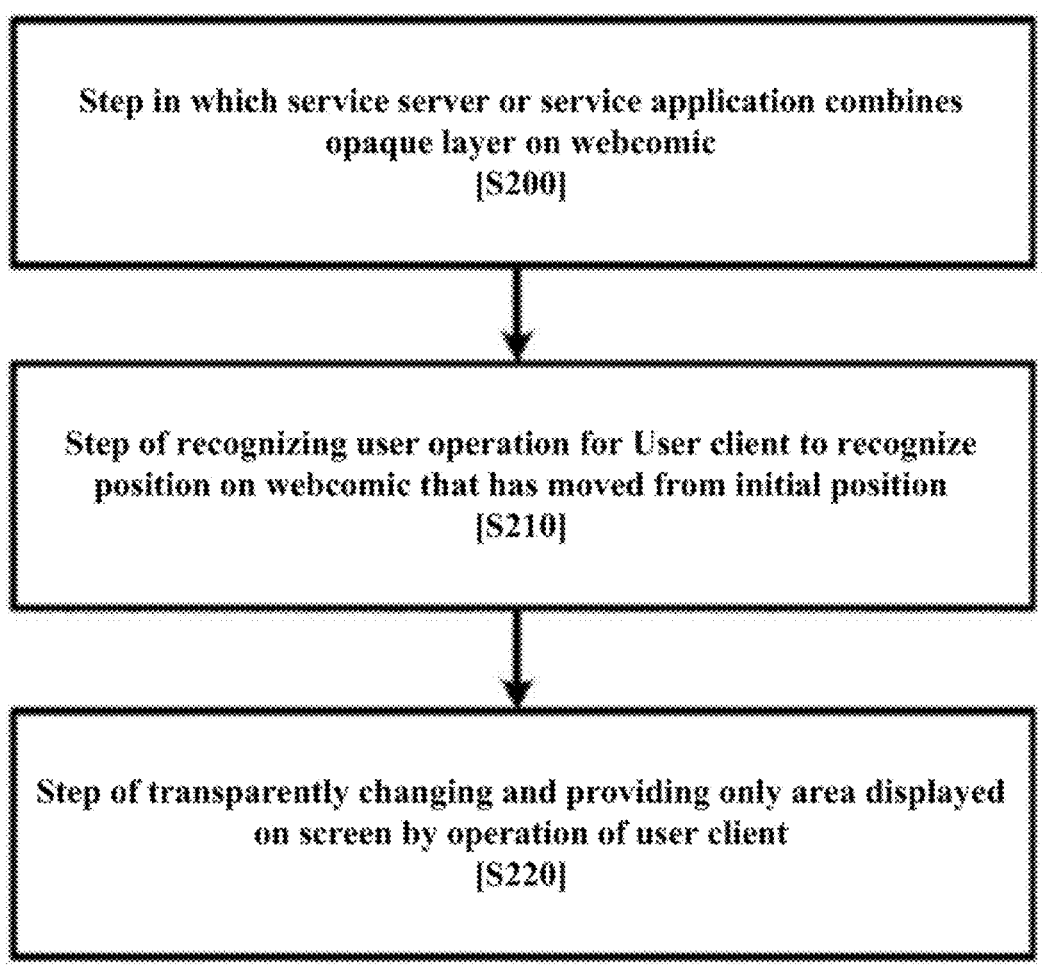
FIG. 3 is a flowchart of a method for preventing unauthorized copies of webcomics, according to another embodiment of the inventive concept.
Figure 4:
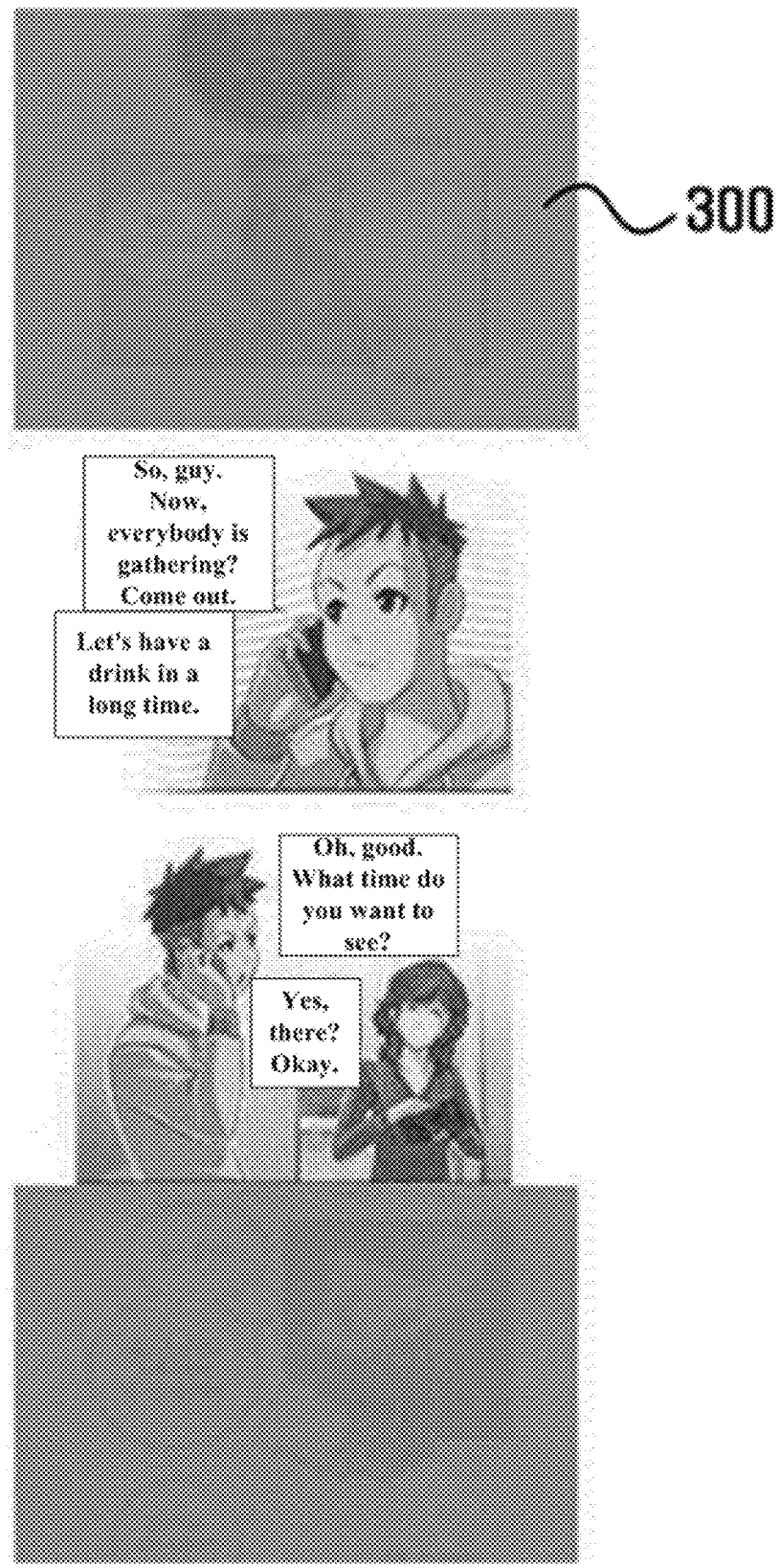
FIG. 4 is an exemplary view in which only an area displayed on a screen of a user client is processed transparently, according to an embodiment of the inventive concept.

Referring to FIGS. 3 and 4, according to another embodiment of the inventive concept, a method for protecting unauthorized copies of webcomics may include a step S200 in which a service server or a service application generates final webcomic data by combining an opaque layer 300 on webcomics, a step S210 of recognizing a user operation for the user client to recognize a position on webcomics moved from an initial position, and a step S220 of transparently changing the area displayed on a screen by the operation of a user client. That is, the illegal copies may be prevented in the manner of combining the opaque layer 300 on the webcomics and transparently providing only the screen display area provided to the user client. Hereinafter, the detailed description about each step is provided.

In step S200, the service server or the service application may combine the opaque layer 300 on webcomics. According to an embodiment, the service server generates final webcomic data obtained by combining the opaque layer 300 with general webcomic data including the dialogue and transmits the final webcomic data to the user client. Furthermore, according to another embodiment, the service application receives general webcomic data from the service server and then combines the opaque layer 300 capable of being transformed into a transparent layer, with the partial area on the webcomics.

In step S210, the service server or the service application recognizes the user operation for the user client to recognize the position on webcomics moved from an initial position (step S210 is the same as step S110).

Afterward, in step S220, the service server or the service application transparently changes and provides the area displayed on the screen, in response to the operation of the user client.

In this way, it is impossible to capture and store the entire webcomics provided through communication to the user client at a time. That is, because a user who desires to illegally distribute webcomics may store the entire areas only when the user captures each portion displayed on the screen of the user client, it is difficult to generate a file for illegally distributing webcomics.

Figure 5:
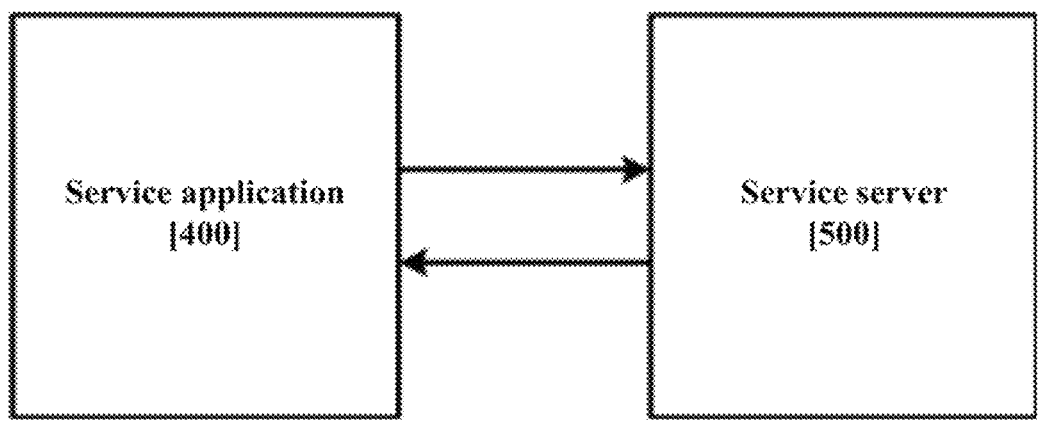
FIG. 5 is a block diagram illustrating a system that tracks replicated webcomics, according to an embodiment of the inventive concept.
Figure 6:
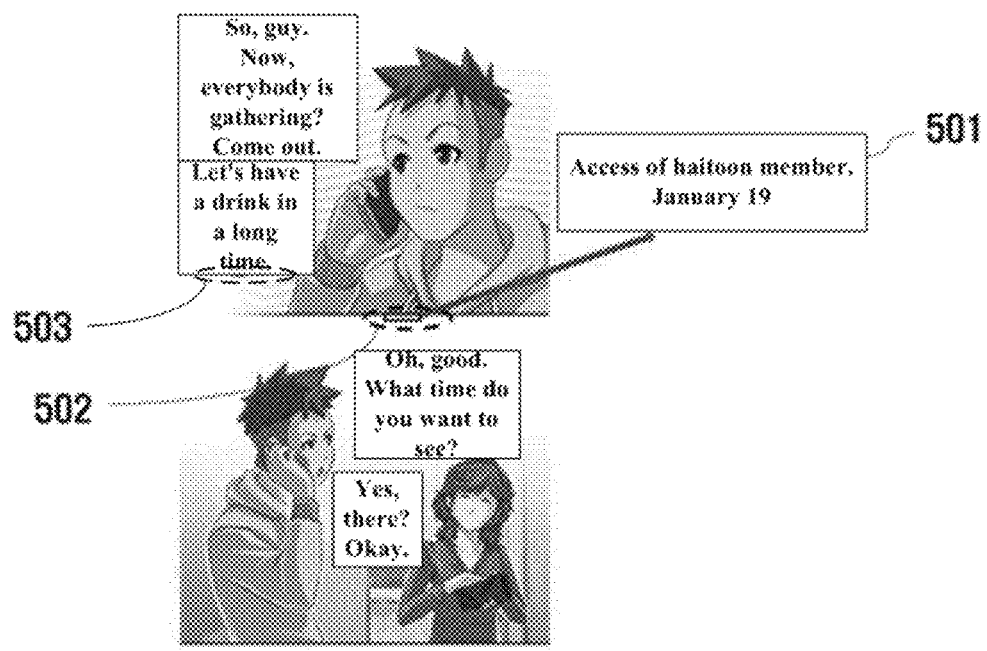
FIG. 6 is a view illustrating an example of a method of tracking replicated webcomics, according to an embodiment of the inventive concept.

FIG. 5 is a block diagram illustrating a system that tracks replicated webcomics, according to an embodiment of the inventive concept. FIG. 6 is a view illustrating an example of a method of tracking replicated webcomics, according to an embodiment of the inventive concept.

Referring to FIG. 5, a service application 400 may receive webcomic data from a service server 500 to provide a user with the webcomic data. At this time, the service application

400 may be one of applications installed in a user terminal and may receive the webcomic data from a server in real time or provide the user with the stored webcomic data.

In the meantime, the service server 500 obtains identification data generated based on at least one of user identification information or usage time information. That is, while transmitting the entire webcomics or the specific episode to the service application 400 of a specific user client, the service server 500 may obtain the user identification information (e.g., a user ID, a telephone number, or the like) and time information, as the identification data. Furthermore, the identification data is not necessarily limited to the above-described configuration; those skilled in the art, to which the inventive concept pertains, will easily understand that the identification data may include various pieces of data for identifying a user downloading the webcomics.

The service server 500 generates a watermark such that the identification data is included in a webcomic image.

For example, referring to FIG. 6, identification data 501 may be transformed into a small text that is not visually identifiable and then may be displayed on an area 502 between webcomic frames, an edge 503 of a speech bubble in the webcomics, or the like. Alternatively, in another embodiment in which the identification data is included in a webcomic image, the service server 500 may add the identification data to the webcomic image in a color that cannot be distinguished by a naked eye because the color is similar to the background color other than the color of the dialogue. Also, the service server 500 may enter the encrypted data without entering the identification data as it is.

In addition, in another embodiment in which the identification data is included in a webcomic image, it is impossible for the user to recognize the identification data, by dividing and displaying data (e.g., data in the form of a bar code) obtained by encrypting the identification data in a plurality of areas within the webcomics. In particular, the service server 500 encrypts the identification data and then generates the encrypted identification data as a specific identification code (e.g., a bar code). Afterward, the service server 500 divides the identification code into a plurality of pieces and then adds the plurality of pieces to the plurality of areas in the webcomics. For example, the service server adds the divided identification codes (i.e., a plurality of identification codes formed after a single identification code is divided) to the area between webcomic frames, the edge of the webcomics, or the like. The service server identifies a user who illegally distributes the webcomics, by extracting and restoring the plurality of divided identification codes included in the illegally distributed webcomics.

The service server 500 may include data for grasping the position and placement order of the divided identification code within the webcomics to restore the identification code. Also, for the purpose of restoring the identification code, the service server 500 may perform division such that a portion with which the identification code overlaps is present, may connect to the divided identification code found in the webcomics, and may make it possible to restore the identification code.

In this way, even in the case where the whole specific episode of the webcomics is provided to the user client as a user subscribes to webcomics without using the service application connected to the service server 500, it is possible to detect a user who illegally distributes the webcomics and then to take action, thereby reducing the illegal attempt of replicating webcomics.

In the meantime, in the descriptions about the illustration in FIGS. 5 and 6, a method in which the service server 500 obtains identification data and generates final webcomic data to provide the service application with the final webcomic data is described. However, those skilled in the art, to which the inventive concept pertains, will easily understand that the service application 400 installed in a client terminal obtains user identification data and then generates a watermark based on the user identification data to generate the final webcomic data such that the watermark is included in the webcomic image.

In the case where the service application 400 generates a watermark, the service server 500 of webcomics does not need to add the watermark to all webcomics; only when a user who illegally replicates webcomics captures or downloads the webcomics, the watermark may overlap with an image and then may be stored as the image; the watermark to which the user identification data is reflected may be included even in an off-line state.

Figure 7:
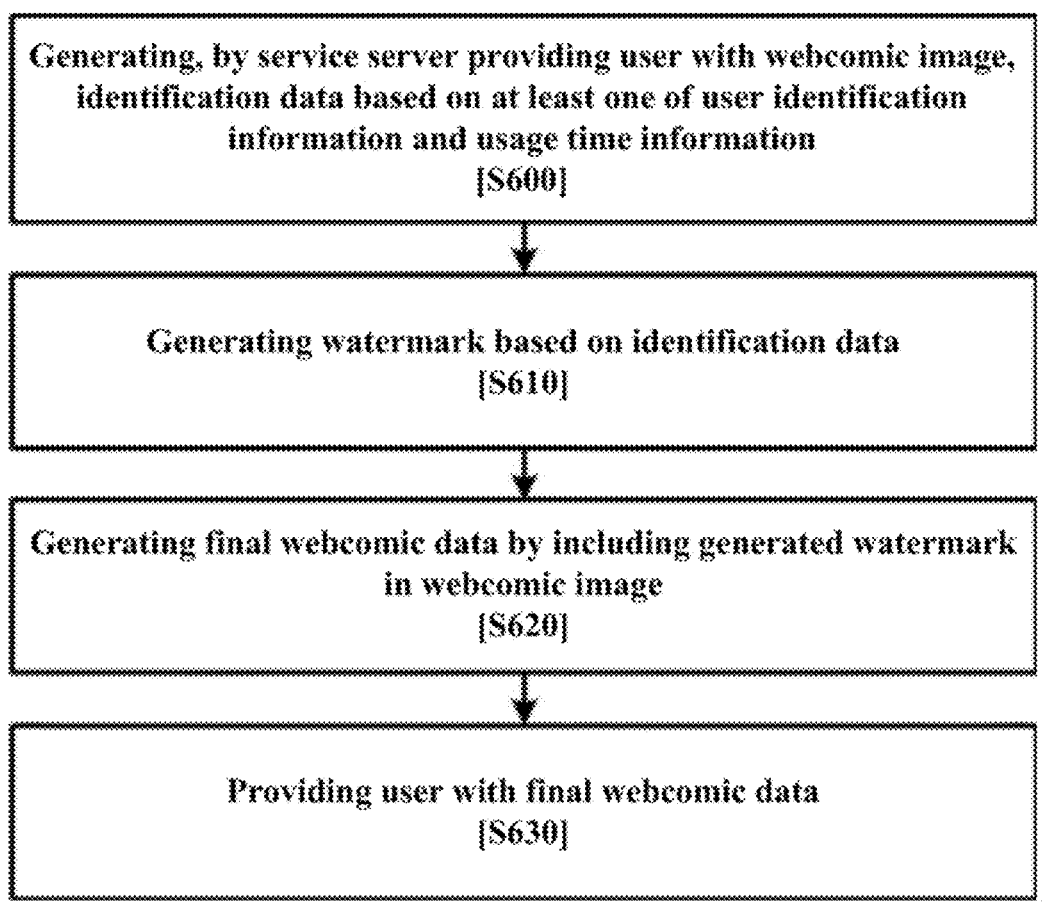
FIG. 7 is a flowchart illustrating a method of tracking replicated webcomics, according to an embodiment of the inventive concept.

FIG. 7 is a flowchart illustrating a method of tracking replicated webcomics, according to an embodiment of the inventive concept.

Referring to FIG. 7, in step S600, the service server 500 providing a user with a webcomic image generates identification data based on at least one of user identification information and usage time information. In the future, it is possible to identify who is an illegal distributor when only the identification data is restored from the webcomic image, by including up to the usage time information as well as the user identification information.

In step S610, the service server 500 may generate a watermark based on the identification data.

At this time, it is possible to generate a plurality of watermarks by dividing the identification data into a plurality of pieces. Furthermore, a part of the divided identification data may be redundant.

The restoration data including information about the position and placement order in which a plurality of watermarks are positioned may be generated to restore the identification data based on the plurality of watermarks. For example, when the identification data is divided into pieces of identification data while the identification mark includes the redundant part and the divided pieces of identification data are combined as the watermark with the webcomic image, there is a need for recombination information such that the divided pieces of identification data are capable of being generated again as the identification mark. The service server 500 or the service application 400 may store the plurality of divided identification data in the form of the restoration data.

Furthermore, when a plurality of watermarks are composed of texts, indistinguishable characters may be set to one group upon restoring the identification data, and a key set of forming the identification data for selecting only one character as a usable character may be set in the set group. For example, similar characters such as 'I' (upper case letter) and 'l' (lower case letter) may be grouped into one group, and it is specified that only one of the characters is available.

In step S620, the service server 500 may generate final webcomic data by including the generated watermark in the webcomic image. At this time, the service server 500 may position the watermark at a position, which is not distinguished by a naked eye in the webcomic image. For example, the watermark may be entered in the form of a bar code in the space between webcomic frames, or may be thinly entered along the image line in the webcomics.

In the meantime, according to another embodiment, the service application 400 may generate the first layer including a webcomic image and may receive a candidate position for attaching the watermark, from the service server 500. Moreover, after the second layer on which the generated watermark is positioned at one of candidate positions is generated, the final webcomic data to be provided to a user may be generated by combining the first layer and the second layer. That is, when separately generating the webcomic image layer and the watermark layer, the service application 400 may recognize the webcomic image to determine the position of the watermark attachment, may obtain information about the predetermined plurality of watermark attachable positions from the service server 500, and may select some of the plurality of positions to allow the plurality of watermarks to be attached.

In step S630, the service application 400 receives the final webcomic data from the service server 500 and provides the user with the final webcomic data. Herein, the service application 400 may include a web browser installed in a user terminal by default, as well as a dedicated application for providing webcomics.

Meanwhile, a method of tracking replicated webcomics may further include searching for the watermark in the replicated webcomic data and restoring the identification data based on the watermark to identify an illegal distributor, when the final webcomic data is replicated.

When one identification mark is divided and then the divided identification marks are positioned in the form of a plurality of watermarks, after the divided watermark unit is found, the identification mark may be restored based on the restoration data for each webcomic.

Figure 8:
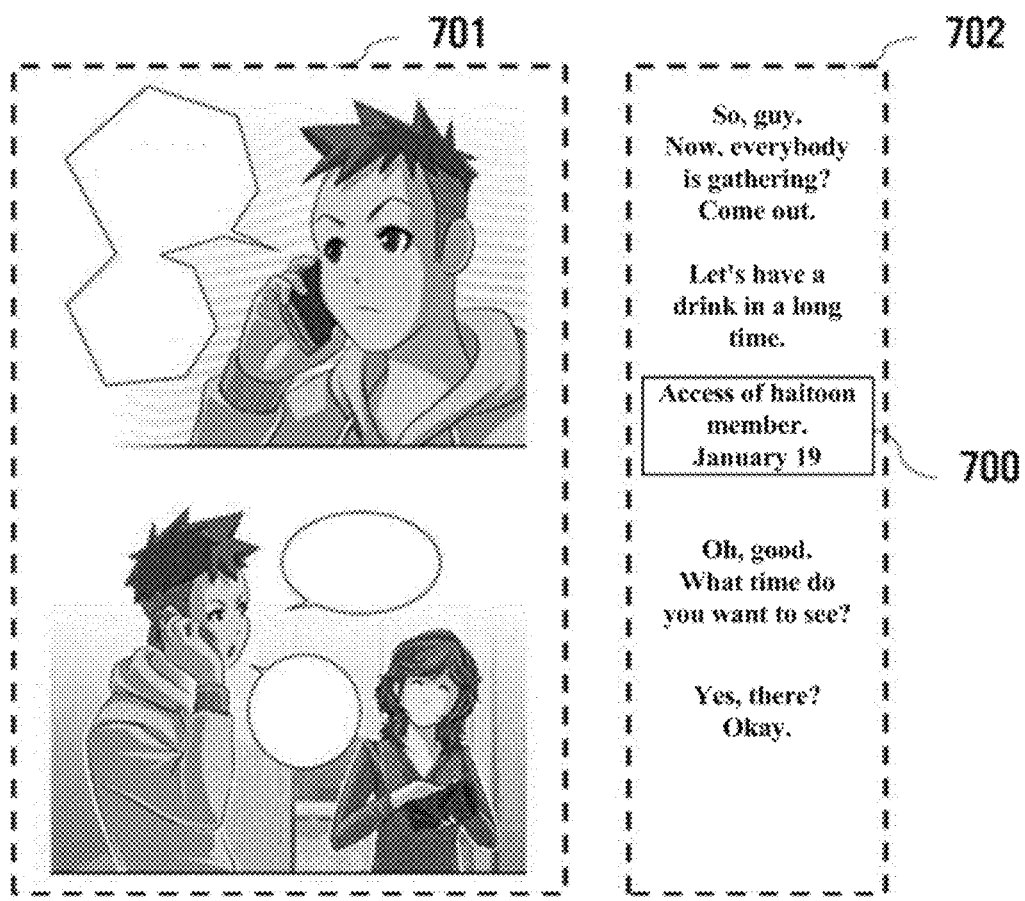
FIG. 8 is a view illustrating an example in which a webcomic image and a watermark are allocated to another layer, according to an embodiment of the inventive concept.

FIG. 8 is a view illustrating an example in which a webcomic image and a watermark are allocated to another layer, according to an embodiment of the inventive concept.

Referring to FIG. 8, final webcomic data may be composed of a first layer 701 including a webcomic image and a second layer 702 including text data. The first layer 701 and the second layer 702 may be displayed while overlapping with each other only in the step provided to a user, and thus it is different for a user to illegally capture or store webcomics. In addition, the second layer 702 includes the watermark based on user identification data 700, and thus the watermark may be easily positioned at a position not visible in the webcomics. In particular, the service application 400 may insert the watermark at different positions for each webcomic, and thus it may be difficult for the illegal replicator to arbitrarily delete the watermark.

Figure 9:
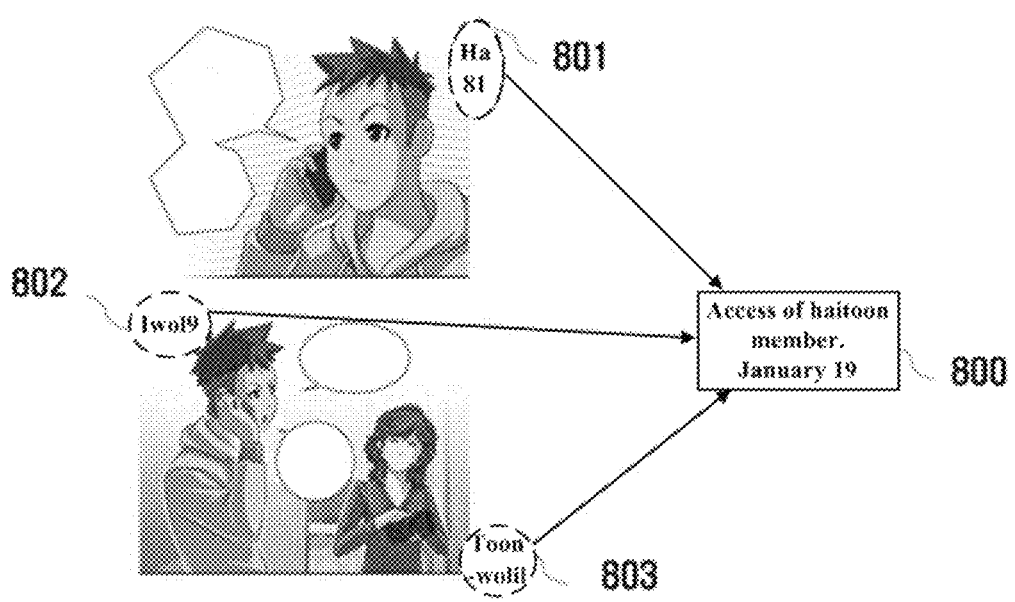
FIG. 9 is a view illustrating an example in which a plurality of watermarks are inserted, according to an embodiment of the inventive concept.

FIG. 9 is a view illustrating an example in which a plurality of watermarks are inserted, according to an embodiment of the inventive concept.

Referring to FIG. 9, identification data 800 may be divided into a plurality of watermarks 801, 802, and 803 and may be displayed in webcomics. At this time, the position to which the watermark is attached may be determined by the application 400 or the service server 500; the watermark may not be displayed in one area but be attached to a plurality of attachable positions after being divided into several areas. Furthermore, in the plurality of watermarks, some (802 and 803) of the identification data may overlap with each other; when each of the plurality of watermarks is observed, the identification data may be displayed while being encrypted such that it is difficult to recognize the identification data. In contrast, at this time, restoration data for again restoring the identification mark may be separately generated and managed.

According to an embodiment of the inventive concept, when the capture itself is not blocked upon subscribing to webcomics using the web browser of a user client, it is possible to detect and punish the illegal distributor by adding the identification data unidentifiable by the user to the webcomics.

In addition, a webcomics server may display the watermark generated based on user account information, together with webcomics; even though the watermark is not added to all webcomics, the watermark layer may be stored together only when the capture or download is performed, and thus the webcomics may be efficiently prevented from being replicated.

According to an embodiment of the inventive concept described above, the method for preventing unauthorized copies of webcomics and tracking the replicated webcomics may be implemented as a program (or application) to be executed in combination with a hardware computer and may be stored in a medium.

The above-described program may include a code encoded by using a computer language such as C, C++, JAVA, a machine language, or the like, which a processor (CPU) of the computer can read through the device interface of the computer, such that the computer reads the program and performs the methods implemented with the program. The code may include a functional codes associated with the function that defines functions necessary to perform the methods, and may include a control code associated with an execution procedure necessary for the processor of the computer to perform the functions in a predetermined procedure. Furthermore, the code may further include additional information necessary for the processor of the computer to perform the functions or a memory reference-related code associated with the position (address) of the internal or external memory of the computer, at which the media needs to be checked. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner.

According to an embodiment of the inventive concept, only the area displayed on the screen of the user client may be combined with a dialogue text or may be displayed transparently, and thus, the entire webcomics may be prevented from being stored even though a user captures the entire successive images (i.e., the whole specific episode of webcomics). In this way, the webcomics may be easily prevented from being unauthorized replicated using the capture function of the user.

Although embodiments of the inventive concept have been described herein with reference to accompanying drawings, it should be understood by those skilled in the art that the inventive concept may be embodied in other specific forms without departing from the spirit or essential features thereof. Therefore, it should be understood that the above embodiments are not limiting, but illustrative.

According to an embodiment of the inventive concept, only the area displayed on the screen of the user client may be combined with a dialogue text or may be displayed transparently, and thus, the entire webcomics may be prevented from being stored even though a user captures the entire successive images (i.e., the whole specific episode of webcomics). In this way, the webcomics may be easily prevented from being unauthorized replicated using the capture function of the user.

Furthermore, according to an embodiment of the inventive concept, when the capture itself is not blocked upon subscribing to webcomics using the web browser of a user client, it is possible to detect and punish the illegal distributor by adding the identification data unidentifiable by the user to the webcomics.

In addition, a webcomics server may display the watermark generated based on user account information, together with webcomics; even though the watermark is not added to all webcomics, the watermark layer may be stored together only when the capture or download is performed, and thus the webcomics may be efficiently prevented from being replicated.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for protecting unauthorized copies of webcomics, the method comprising:
   configuring, by a service server device, a database in which an original webcomic image and an original dialogue text, which are included in original webcomic data received from a webcomic maker client device are separately stored;
   receiving, by a user client device, a user input;
   transmitting, by the user client device, information about the user input, to the service server device;
   identifying, by the service server device, based on the information about the user input, a current display position on a webcomic, which has moved from an initial display position on the webcomic;
   identifying, by the service server device, a next webcomic image frame that is configured to follow a current webcomic image frame that is displayed on the current display position;
   generating, by the service server device, final webcomic image data by combining the next webcomic image frame with next dialogue texts, which are stored in the service server device and are corresponding to the next webcomic image, and deleting original dialogue texts which are originally included in the next webcomic image;
   transmitting, by the service server device, the generated final webcomic image data to the user client device; and
   displaying, by the user client device, in real time, an image according to the generated final webcomic image data.

2. The method of claim 1, wherein the configuring comprises:
   receiving, by the service server device, the original webcomic image and the original dialogue text from the webcomic maker client device in a state where the original webcomic image and the original dialogue text are separated.

3. The method of claim 2, wherein the webcomic maker client device separates the original webcomic image and respective dialogue data using a dedicated program to generate a respective file, when a dialogue on the original webcomic image is received directly from a webcomic maker.

4. The method of claim 1, wherein the original dialogue text includes pieces of respective dialogue data, and
   wherein each of the pieces of respective dialogue data includes combination position data to be displayed in a specific webcomic image frame.

5. The method of claim 4, further comprising:
   dividing, by the service server device, the original webcomic image into each webcomic image frame to assign first identification information;
   assigning, by the service server device, second identification information to each dialogue combination position in the original webcomic image; and
   adding, by the service server device, the first identification information and the second identification information about a dialogue combination position of the specific webcomic image frame matched with each of the pieces of respective dialogue data, to each of the pieces of respective dialogue data as the combination position data.

6. The method of claim 1, wherein the generating the final webcomic image data comprises:
   providing, by the service server device, the user client device with a specific webcomic image of a specific episode;
   extracting, by the service server device, respective dialogue data corresponding to a current screen display area or a webcomic frame adjacent to the current screen display area, from the dialogue text to transmit the respective dialogue data to the user client device; and
   combining, by the service server device, the respective dialogue data with the specific webcomic image in real time.

7. A non-transitory computer readable storage medium storing instructions/program which, when executed by a computer, cause the computer to carry out a method of claim 1, for protecting unauthorized copies of webcomics.

* * * * *